US008545348B2

(12) United States Patent
Ulrich et al.

(10) Patent No.: US 8,545,348 B2
(45) Date of Patent: Oct. 1, 2013

(54) GOLF-COURSE GUIDE

(76) Inventors: Franz Ulrich, Wilen b. Wollerau (CH);
Dirk Projahn, Zurich (CH)

(*) Notice: Subject to any disclaimer, the term of this patent is extended or adjusted under 35 U.S.C. 154(b) by 314 days.

(21) Appl. No.: 12/989,435

(22) PCT Filed: Apr. 27, 2009

(86) PCT No.: PCT/EP2009/003046
§ 371 (c)(1),
(2), (4) Date: Dec. 30, 2010

(87) PCT Pub. No.: WO2009/130054
PCT Pub. Date: Oct. 29, 2009

(65) Prior Publication Data
US 2011/0105249 A1     May 5, 2011

(30) Foreign Application Priority Data
Apr. 26, 2008   (CH) .......................................... 663/08

(51) Int. Cl.
*A63B 57/00*    (2006.01)
(52) U.S. Cl.
USPC .......................................... 473/407; 473/169
(58) Field of Classification Search
USPC ........... 473/168, 169, DIG. 25, 407; 434/252
See application file for complete search history.

(56) References Cited

U.S. PATENT DOCUMENTS

| 3,820,786 | A | * | 6/1974 | Candor | 473/409 |
| 3,949,987 | A | * | 4/1976 | Candor | 473/407 |
| 4,505,478 | A | * | 3/1985 | Riethmiller | 473/407 |
| 4,655,451 | A | * | 4/1987 | Townsley | 473/407 |
| 4,666,156 | A | * | 5/1987 | Wakisaka | 434/152 |
| 4,666,157 | A |   | 5/1987 | Bodine et al. | |
| 6,027,417 | A | * | 2/2000 | Zoretic et al. | 473/407 |
| 2010/0312474 | A1 |   | 12/2010 | Balardeta et al. | |

OTHER PUBLICATIONS

Orthophoto, from Wikipedia, printed Aug. 1, 2012.

* cited by examiner

*Primary Examiner* — Nini Legesse
(74) *Attorney, Agent, or Firm* — Brian Roffe

(57) ABSTRACT

A golf-course guide is provided with true to scale information maps of the individual holes for orientation about the quirks and distances of the respective hole. Detailed golf-course features which serve at least as an orientation aid for visual position determination are indicated by way of each information map of the respective hole which is shown to scale. A measurement aid is provided which includes a distance scale which corresponds to the scale of the information map, in order for it to be possible to determine the distances which are relevant for the player. A golf-course guide of this type can be handled simply and produced inexpensively.

20 Claims, 3 Drawing Sheets

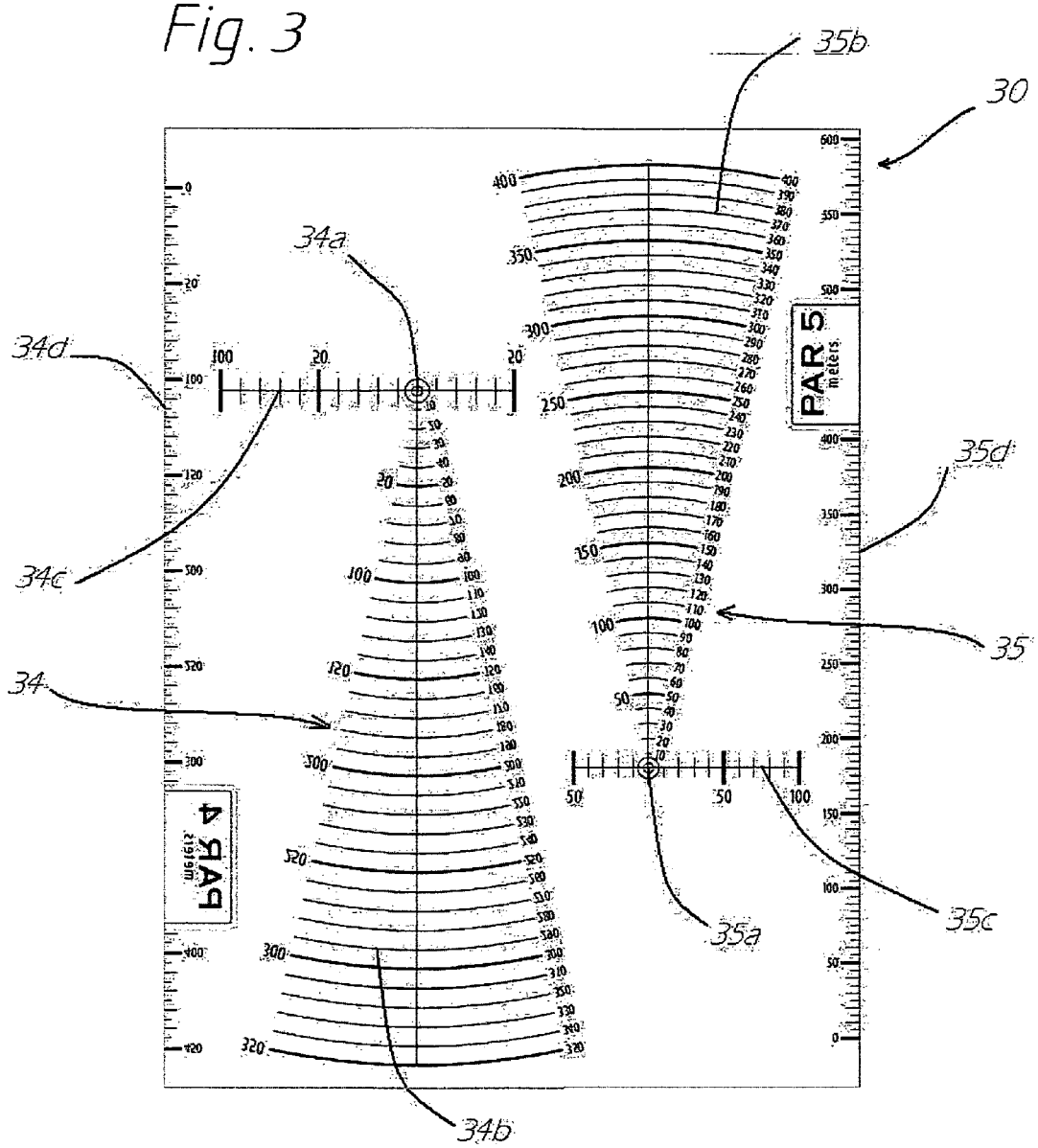

GOLF-COURSE GUIDE

FIELD OF THE INVENTION

The invention relates to a golf course guide with true to scale information maps of individual holes for orientation about quirks and distances of the respective hole.

BACKGROUND OF THE INVENTION

It is known and customary to make available to golfers golf course guides in the form of handy brochures or booklets with information maps of the individual holes so that they can get their bearings regarding the quirks of the respective holes and especially the distances before and during play. The reproduction size of the individual information maps is determined by the respective dimensions of the hole, the available format being exploited as fully as possible.

The details charted in these maps include in the known golf course guide designs e.g. the hole lengths, measured at the various tees, distances to the start of bunkers and end of bunkers and other obstacles, as well as distances to the start and/or the middle and if need be also to the end of the green, and additionally also directions of inclines. The disadvantage of these golf course guides is that current ball positions and distances can generally only be determined from these maps to a very limited extent and only laboriously by adding or subtracting or by proportional estimations.

For a number of years hand-held computers and computer systems fitted onto motorised golf carts have been available on the market which determine the current ball or golf cart position by means of satellite navigation. The latter is displayed visually on digital hole maps, and the player is provided with further information such as e.g. distances to the start of the green or the middle of the green, to the obstacle etc. Moreover, with some systems it is possible for the player to save his results.

It is a disadvantage here that the operation of these computers is complex and relatively complicated, and so it can lead to delays in play which is particularly unpleasant and disruptive if a number of flight partners are involved and, moreover, if the flights follow on from one another at short intervals of time.

The computer systems fitted onto golf carts widely used particularly in the USA additionally have the disadvantage that the player moving over the hole can not can access to the information at all times and in all places, but only directly from the golf cart. After the end of play the information can not easily be taken away by the player. At best the results can be printed out in the clubhouse, and this is laborious.

A further disadvantage of these systems is that in many cases only the distance to the green is directly indicated. Tactical analyses, for example for dividing up the distance still to be negotiated into sections which can be played with specific clubs are not easily possible.

OBJECTS AND SUMMARY OF THE INVENTION

The object forming the basis of the present invention is to provide an easy to handle and inexpensive golf course guide which provides all of the distance and additional information required for the game of golf with sufficient accuracy, and enables simple game strategy determination without the use of electronics.

This object is achieved according to the invention by a golf course guide wherein each information map of the respective hole shown to scale indicates detailed golf course features which serve at least as an orientation aid for visual position determination, a measurement aid with a distance scale which corresponds to the scale of the information map is provided in order to be able to determine the distances of the holes relevant for the player, the information maps are designed as orthophotos of the holes or as a combination of orthophotos with overlaid vector data with or without additional graphic processing.

Further preferred embodiments of the golf course guide according to the invention form the subject matter of the dependent claims.

The golf course guide according to the invention comprises information maps of the individual holes, each information map of the respective hole shown to scale indicating detailed golf course features which serve as an orientation aid for visual position determination. Preferably the information maps are in the form of orthophotos, i.e. true to scale aerial images. Furthermore, according to the invention the golf course guide includes a measurement aid means with a distance scale which corresponds to the scale of the information map in order to determine all of the distances relevant for the golfer. In one preferred embodiment the measurement aid means has a number of distance scales corresponding to the different scale of a number of information maps.

In a particularly advantageous way the measurement aid means is in the form of a transparent film or plastic card. Preferably e.g. one or a number of sectors with distance ring sections are shown on the plastic card which form the individual distance scales. With the measurement aid means all of the distances relevant for the player, e.g. to the obstacles and the green, from the respective current ball position can be measured in the simplest of ways and at a single glance, and the ideal tactics for the next shot can be determined.

The golf course guide according to the invention is simple and inexpensive. It is purely a printed product which can be reproduced inexpensively, with an adapted, simple measurement aid means—no expensive electronic aid means too complicated for most golfers are required.

The game of golf can proceed without any delays, and in addition tactical analyses, e.g. for the division of the course still to be negotiated into sections which can be played with specific clubs, can be implemented simply, as is hardly possible when using known computer systems.

BRIEF DESCRIPTION OF THE DRAWINGS

In the following the invention is described in greater detail by means of the drawings. These show as follows:

FIG. 3 is a variation of a measurement aid means to which two distance scales for par 4 and par 5 are assigned.

DETAILED DESCRIPTION OF THE INVENTION

Figure 1:
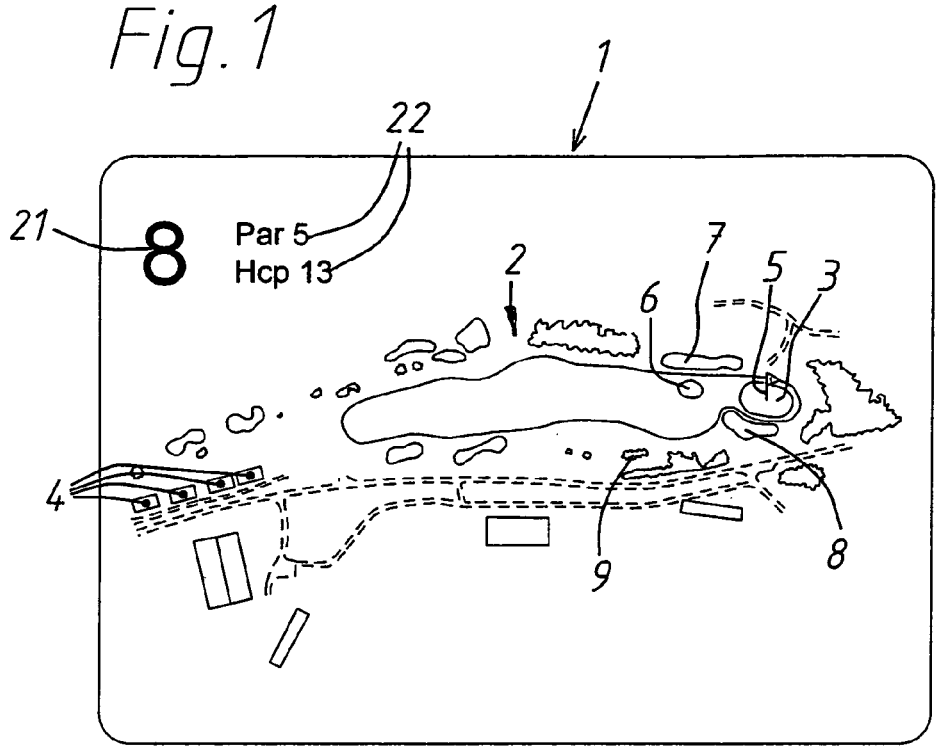
FIG. 1 is an exemplary embodiment of an information map of a hole which forms part of a golf course guide according to the invention.

FIG. 1 shows an information map 1 of a hole 2 of a golf course guide which is, for example, 505 meters long and is provided for so-called par 5. The information map 1 forms part of a golf course guide according to the invention which includes a number of these types of information map of individual holes of a golf course (e.g. maps of a number of par 3, par 4 and/or par 5 holes) and which is in the form of a booklet or a ring binder with a number of pages. The individual information maps can have different scales. The reproduction size of the individual maps is determined by the dimensions of the respective hole, the available format being exploited as fully as possible in order to achieve the highest possible degree of detail for the information map. A hole 2 with a specified par 3, 4 or 5 comprises respectively the playable range from the tee 4 to the vicinity of a green 3.

The information maps are preferably in the form of aerial images reproducing the situation true to scale, e.g. so-called orthophotos, i.e. images, in particular aerial images, deskewed as regards the topography, and so true to scale. They can if necessary be graphically reworked, e.g. for better identification of hole and green edges, water obstacles, habitats, outer limits, tees, special course signs etc. Furthermore, they could also be in the form of a combination of orthophotos with overlaid vector data (so-called hybrid map illustrations). The orthophoto information can be graphically processed in order to give a better overview and legibility.

It should be mentioned with regard to these orthophotos that with an aerial photo distortions occur due to the photographic central projection, and distortions also occur due to differences in height of the terrain. Digital photos or scanned analogue aerial images are re-calculated (deskewed) by means of digital terrain models. By bringing together individual orthophotos large-scale orthophoto mosaics can be produced. Orthophotos can be produced to different scales and resolutions depending on the intended use.

Due to the true to nature reproduction of a hole 2, in comparison to conventional maps orthophotos offer a far greater density of information because no information is lost due to cartographical generalisation. This density of information makes it possible for the golfer to determine his position accurately purely upon the basis of visual reference points on the golf course, and to determine the distances and the information required for establishing game strategy quickly and accurately.

The orthophotos are produced from aerial photos at a distance of preferably between 50 and 1000 meters. The aerial photos are taken by means of a combination of different sensors, namely digital camera, laser scanner, satellite positioning system or similar, inertial measurement unit and/or other instruments.

The distortions occurring with the aerial photos due to the photographic central projection and distortions due to differences in height of the terrain are eliminated and converted by means of the digitally recorded terrain models.

In FIG. 1, for example, one can see, true to scale, the green 3 with a flag 5 marking the hole, different tees 4 (e.g. for pros, men and women), bunkers 6, 7 and 8, and many other individual golf course features, such as for example bushes 9, which serve as orientation aids for visual position determination. The information maps could, however, also be detailed maps produced with known measuring methods or so-called hybrid maps, i.e. maps with a combination of image data with overlaid vector data with which, for example, the photos are supplemented with non-visible lines (e.g. outer limits) or individual points.

Furthermore, additional details could be included on a respective information map such as terrain suitabilities, incline directions or other features not visible or only visible to a limited degree here. As an example, details 21, 22 of hole No. 8 with a par 5 with a handicap 13 are included.

Figure 2:
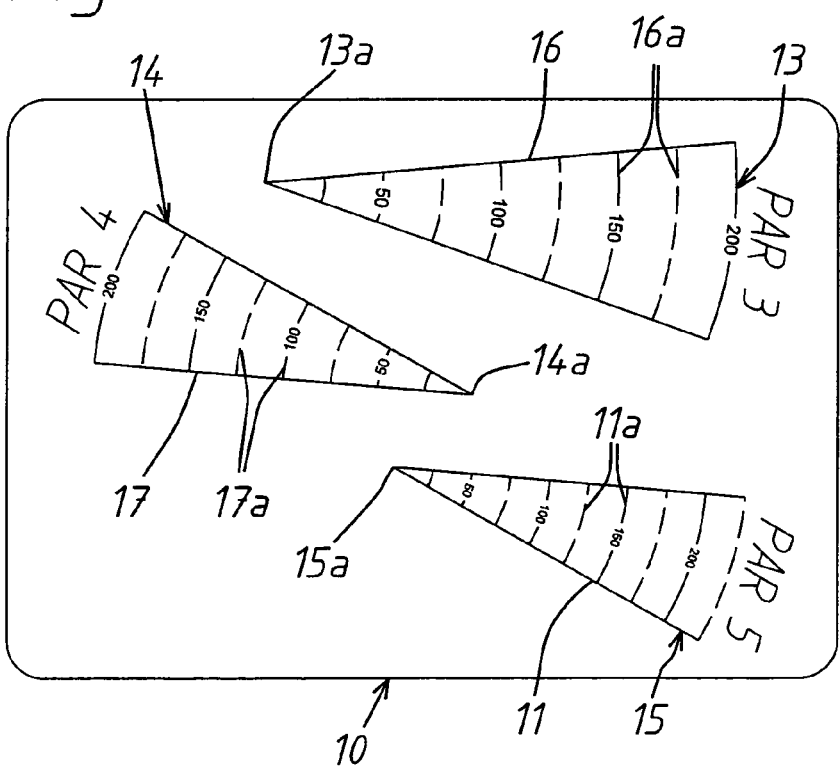
FIG. 2 is an exemplary embodiment of a measurement aid means which forms part of the golf course guide according to the invention.

The golf course guide further includes according to the invention a measurement aid means 10, evident from FIG. 2, with a respective distance scale corresponding to the scale of the information map 1. The measurement aid means 10 is advantageously in the form of a transparent plastic card, preferably made of a flexible material, or of a transparent film, which includes one or more illustrations.

Thus, for example, on the card according to FIG. 2 forming the measurement aid means three sectors 13, 14, 15 starting respectively from a zero point 13a, 14a, 15a with centric distance ring sections 16a, 17a, 11a are shown which form three different distance scales 16, 17, 11 which are provided for par 3, par 4 and par 5, and correspond to the scales of the information maps provided for par 3, par 4 and par 5. Advantageously the individual distance scales 11, 16, 17 can have a different feature, e.g. with colours, which correspond to a different type of identification with the par 3, par 4 and par 5 hole maps.

The format of the plastic card substantially corresponds to that of the information map 1 which is advantageously also in the form of a preferably flexible plastic card. It is advantageous if the golf course guide in the form of a booklet or ring binder has a type of transparent pocket or some other possibility for safe-keeping or attachment of the card-type measurement aid means 10.

With the transparent measurement aid means 30 according to FIG. 3 the scale for par 3 is omitted with respect to the measurement aid means 10 according to FIG. 2 since with the holes with par 3 this type of position determination is not so significant. Two sectors 34, 35 starting respectively from a zero point 34a, 35a with centric distance ring sections 34b, 35b are shown which are provided for par 4 and par 5 and correspond to the scales of the information maps provided for par 4 and par 5, the sectors being labelled in a mirror image to one another in order to avoid confusion. With the present measurement aid means 30, in addition with the zero points 34a, 35a and with the two side edges distance scales 34c, 34d and 35c, 35d are formed perpendicularly to one another with which the distances can be measured accurately.

If the golf course guide includes information maps with different scales, different distance scales must also be available. Of course a number of measurement aid means each with a distance scale could be provided, but it is particularly advantageous if only one measurement aid means with a number of distance scales corresponding to the different scale of a number of information maps is provided so that the distances of all of the holes of a golf course can be measured with just one measurement aid means.

With this optical positioning the player can very quickly determine his current ball position at the tee 4 and on the hole 2 by means of the golf course features, such as trees, bushes, bunkers, houses, rivers, bodies of water etc. illustrated true to scale on the information map 1. With the measurement aid means 10 he can then accurately measure all relevant distances, e.g. to the green, to the obstacles etc. in the simplest of ways and at a single glance, and from this determine the ideal tactics for the next stroke.

Figure 4A:
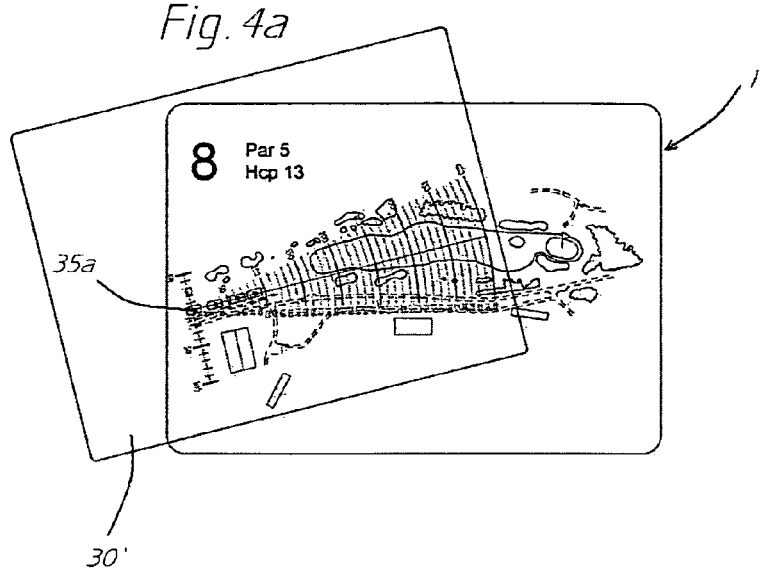
FIG. 4a to FIG. 4c show the information map according to FIG. 1 with 3 different positions with respectively the information map and the measurement aid means laid over the latter.
Figure 4B:
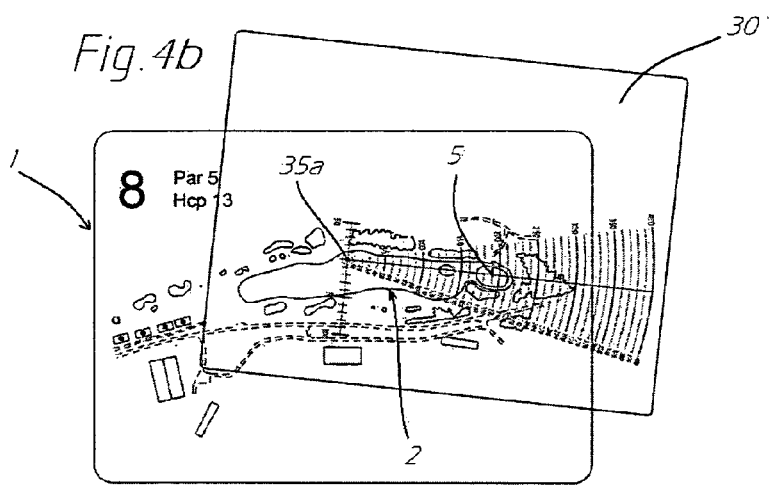
Figure 4C:
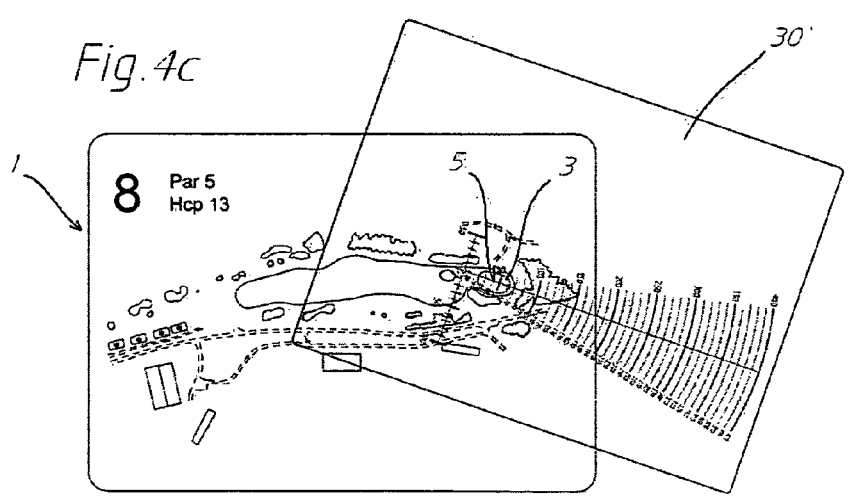

FIG. 4a to FIG. 4c illustrate the use of the golf course guide according to the invention by means of the information map 1 according to FIG. 1 and the measurement aid means 30 according to FIG. 3. Three different positions are shown with respectively the information map 1 and the transparent measurement aid means 30' laid over the latter, only the sector 35 of the latter for par 5 being visible here for better illustration. The sector 34 appearing in a mirror image is omitted.

With FIG. 4a the measurement aid means 30' with its zero point 35a is laid over the tee with the information map 1. The player can deduce from this, for example, which golf club he wishes to use, and if need be how far the ball has flown when hit.

With FIG. 4b there is once again a ball position on the hole 22 at the zero point 35a of the measurement aid means 30'. The player can very quickly see from this how far the distance still to the flag 5 is and also in between so that he can determine the strategy regarding which club he wishes to use and how far he should aim to hit with the latter.

FIG. 4c then shows a further ball position not far from the green 3. Here too he can determine the distance to the green 3 or to the flag 5 very accurately. The distance scale 35c provided perpendicularly to the sector 35 additionally helps him as an alignment for accurately determining the position of the ball on the hole because with this he can if necessary accurately position objects next to the hole, such as for example a tree, with the aid of this alignment. Moreover, with this distance scale 35c lateral deviations, for example when the ball drifts away, can be measured. By means of these orthophotos according to the invention together with the measurement aid means 30 this can also be determined extremely accurately because all of the details of the hole can be seen true to scale.

In one particularly suitable embodiment the information maps have respectively one surface that can be marked, preferably e.g. a plasticisation that can be written on with a pencil. This makes it possible to draw in the position of the ball that has been played, and so also to precisely record (map) each individual shot, and so the whole course of a round of golf using the simplest of means. The course of the game in general, the stroke lengths, flight distances etc. can be recorded and analysed a posteriori. The player is provided with a basis for the statistical evaluation of his performance (e.g. error distribution, percentage proportion of the shots which fulfilled the requirements etc.). The entries made with a pencil can be removed without leaving any trace.

Within the framework of the invention the information maps can respectively include on one part at least one photo which is taken in particular in the direction of the green 3 of a hole 2. Especially with hilly holes there are points where the target flags or the green can not be seen. With these photos it is possible to provide the player, in addition to the information about the local factors of a point of the course not visible or not sufficiently visible from the playing position with markers by means of reference points (on the photo), for better orientation so that the player knows approximately in which direction he must hit the ball.

Within the framework of the invention the information maps can respectively include on one part an enlargement of the green 3 with distance details so that the player has at his disposal accurate distance values in this regard.

The round of golf played and precisely recorded with the gold course guide without electronic aid means (e.g. GPS systems) can subsequently be visualised in a map. It is therefore also possible to produce a one-off souvenir in the form of a personal course overview map (name of the course, occasion, names of the flight partners, date, description of the round played, ball positions, flight paths, lines etc.).

In one preferred embodiment the information maps are plasticised such that they can be marked with a pencil, and so are weather-proof. The measurement aid means preferably in the form of a transparent plastic card is also weather-proof. Due to the weather resistance and cleanability these information maps preferably bound as booklets can be reused and so it is also possible to sometimes loan/rent out the golf course guide. Advantageously general course or golf club information, a score card, a table for systematically recording/listing the stroke lengths, a page for individual notes and a page with instructions and tips as well as optional further information are also included in the booklet. Furthermore, additional information could be incorporated such as clubs played, player abbreviations, strike numbers, comments, etc. All of the pages and the measurement aid means can also be provided with advertising messages.

It is also possible, however, to produce the measurement aid means instead of in the form of a card or film for example as a pen, required in any case, with a round or square cross-section and provided with one or more distance scales.

The golf course guide according to the invention is very simple to handle (to a large extent with one hand during the match) and inexpensive to produce. It is purely a printed product that is advantageously produced in pocket format with an adapted, simple measurement aid means—no expensive electronic aid means too complicated for most golfers are required.

As an additional variation a golf course guide can be designed according to the invention such that orthophotos are available for the holes 2 at different seasons so as to take into account the natural changes depending on the season. In particular one can in this way visually record trees, bushes etc. with or without leaves.

The invention claimed is:

1. A golf course guide, comprising:
    true to scale information maps, one for each individual hole for orientation about quirks and distances of the respective hole, each information map of the respective hole shown to scale indicating detailed golf course features of that respective hole which serve at least as an orientation aid for visual position determination, the information maps being orthophotos of the holes or a combination of orthophotos with overlaid vector data, information maps for holes of the golf course having the same par being configured to the same scale; and
    a single measurement aid with a plurality of distance scales that correspond to the scales of the information maps, the measurement aid being separate from the information maps and enabling distances of the holes to be determined upon overlaying of the measurement aid over the information maps,
    the measurement aid being a transparent plastic card or a transparent film made of a flexible material,
    the measurement aid including at least two sectors with centric distance ring sections that form different distance scales, each of the distance scales being associated with par 3, par 4 or par 5 and corresponding to the scales of the information maps provided for par 3, par 4 or par 5, respectively.

2. The golf course guide according to claim 1, wherein the orthophotos provided for the information maps are distortion-free photographic images of the hole true to nature and true to scale.

3. The golf course guide according to claim 1, wherein the measurement aid includes two sectors that form different distance scales corresponding to two different scales of the information maps for two of par 3, par 4 and par 5.

4. The golf course guide according to claim 1, wherein the information map is a hybrid map wherein the orthophoto or orthophotos is or are combined or overlaid with vector data to add non-visible lines or individual points to the photos.

5. The golf course guide according to claim 1, wherein the scales of the information maps are configured such that the distances of all of the holes of a golf course can be measured with just the one measurement aid.

6. The golf course guide according to claim 1, wherein the transparent plastic card or film includes an illustration of the at least two sectors with centric distance ring sections, said distance ring sections forming the distance scale.

7. The golf course guide according to claim 6, wherein the measurement aid includes three sectors that form three different distance scales corresponding to three different scales of the information maps for par 3, par 4 and par 5.

8. The golf course guide according to claim 1, wherein the information maps have a markable surface in order to enable recordation of information thereon.

9. The golf course guide according to claim 1, wherein the information maps are combined to form a booklet or a ring binder, the booklet or ring binder and the information maps being attached to one another.

10. The golf course guide according to claim 1, wherein additional details such as terrain suitabilities, incline directions or other features not visible or only visible to a limited extent are included on the respective information map.

11. The golf course guide according to claim 1, wherein the orthophotos are produced by aerial photos from a distance of between 50 and 1000 meters.

12. The golf course guide according to claim 11, wherein the aerial photos for the production of the orthophotos are taken by means of a combination of different sensors.

13. The golf course guide according to claim 11, wherein distortions occurring when taking aerial photos due to the photographic central projection and distortions due to differences in height of the terrain are corrected such that the orthophotos are produced by calculations using digitally stored terrain models.

14. The golf course guide according to claim 1, wherein the orthophotos are provided of the holes at different seasons in order to take into account natural changes depending on season.

15. The golf course guide according to claim 1, wherein the information maps are configured as a combination of orthophotos with overlaid vector data with additional graphic processing.

16. The golf course guide according to claim 1, wherein at least one of the information maps includes indicia representing bunkers.

17. The golf course guide according to claim 1, wherein at least one of the information maps includes indicia representing bushes.

18. The golf course guide according to claim 1, wherein each of the at least two sectors extends from a respective zero point, and the at least two sectors do not overlap one another.

19. The golf course guide according to claim 1, wherein the at least two sectors includes only two sectors, the two sectors being in mirror image to one another such that positioning the transparent plastic card or transparent film with one planar surface facing upward enables use of one of the two sectors and positioning the transparent plastic card or transparent film with the other planar surface facing upward enables use of the other of the two sectors.

20. The golf course guide according to claim 1, wherein the information maps include only one information map for each hole of the golf course.

* * * * *